United States Patent [19]

Nilssen

[11] 4,422,015
[45] Dec. 20, 1983

[54] ELECTRIC INSECT TRAP POWER SUPPLY

[76] Inventor: Ole K. Nilssen, 1984 Caesar Dr. - Rte. 5, Barrington, Ill. 60010

[21] Appl. No.: 246,006

[22] Filed: Mar. 20, 1981

[51] Int. Cl.³ .................... H04B 37/02; H04B 41/36; H05C 1/02; A01M 1/22
[52] U.S. Cl. ............................ 315/209 R; 315/178; 315/210; 315/212; 315/220; 315/287; 323/307; 363/25; 307/326; 43/112
[58] Field of Search ............ 315/178, 209 R, 210, 315/212, 220, 287, DIG. 2; 323/306, 307, 302; 363/15, 25; 307/17, 326; 328/7

[56] References Cited

U.S. PATENT DOCUMENTS

| 4,016,477 | 4/1977 | Ghiringhelli | 315/212 X |
|---|---|---|---|
| 4,184,128 | 1/1980 | Nilssen | 315/220 X |
| 4,207,498 | 6/1980 | Spira et al. | 315/210 X |
| 4,248,005 | 2/1981 | Hedstrom | 43/112 |

*Primary Examiner*—Eugene R. LaRoche
*Assistant Examiner*—Vincent De Luca

[57] ABSTRACT

A power supply for an electric insect trap having an electrocution grid and a fluorescent lamp for attracting insects to the grid employs an inverter to generate a high frequency alternating voltage. The alternating voltage is applied across the primary winding of a first transformer having a secondary winding for development of a current-limited voltage for operating the lamp. Due to large inductance, the secondary winding functions as a constant current source to the lamp, so that lamps having different voltage characteristics may be used in the same circuit. A high voltage transformer has a primary driven by the limited lamp current to produce a high voltage for the electrocution grid across its secondary winding. Current limiting is achieved, in part, by providing a selected amount of flux leakage between the primary and secondary windings of the first transformer. Alternately, current limiting for the high voltage transformer output is achieved by providing the high voltage transformer core with a selected amount of flux leakage. A capacitor connected in parallel with one primary winding of the high voltage transformer functions to filter out harmonics of the alternating voltage frequency or to cause the transformer to operate in a ferro-resonant mode. When operating in a pseudo-ferro-resonant mode, saturable, toroidal transformers for providing drive and feedback to switching transistors in the inverter are thermally coupled with the high voltage transformer core. Those toroidal core transformers function to change the frequency of the alternating voltage applied to the high voltage transformer to offset changes in its output caused by temperature induced changes in the saturation limits of its core. A capacitor for AC coupling the high voltage to a lamp cathode causes a field to be created between the lamp and the electrocution grid to assist in starting the lamp.

32 Claims, 5 Drawing Figures

ELECTRIC INSECT TRAP POWER SUPPLY

SUMMARY OF THE INVENTION

Field of the Invention

This invention relates to power supplies for electric insect traps of the type having an electrocution grid for killing insects and, more particularly, of the type having a fluorescent lamp for producing light to attract insects to the grid.

Background of the Invention

Electric insect traps of this general type are known. Examples are shown in U.S. Pat. No. 3,321,862 of Peek; U.S. Pat. No. 3,491,478 of Gilbert; U.S. Pat. No. 3,935,662 of Hamid et al. and U.S. Pat. No. 4,182,069 of De Yoreo. However, all of these insect traps provide one circuit for ballasting a flourescent lamp and a separate circuit for providing the requisite high voltage for the electrocution grid.

Another electric insect trap power supply is known in which a secondary winding is inductively coupled with a conventional lamp ballast winding to produce a modest high voltage signal. However, current limiting for high voltage is not obtained by virtue of this coupling and must be provided by separate circuitry.

Although high frequency inverter technology has long been available, no electric insect traps are known which use inverters to develop the needed lamp drive and high electrocution voltage. Accordingly, in known electric insect traps, the high voltage transformer is driven with a low frequency alternating voltage such as available from the standard 60 Hz., 120 volt AC power distributed by electrical power utilities. Because of this low frequency, the high voltage transformers in known electric insect traps are heavy, large and relatively expensive.

In addition to the requirement that the fluorescent lamp be powered by a current limited voltage, for safety reasons it is also required that the high voltage applied to the electrocution grid be current-limited. In known circuits, current limiting for the fluorescent lamp is achieved by means distinct from the means for achieving current limiting for the high voltage.

Objects of the Invention

The principal object of my invention is to provide a power supply for an electric insect trap which is more efficient, less expensive, smaller in size, and lighter in weight than known electric insect trap power supplies of comparable output.

In keeping with this objective, I provide a power supply for an electric insect trap of the type having an electrocution grid and a fluorescent lamp for attracting insects to the grid, in which a limited current is generated for operating the lamp. This limited current is used to produce a high voltage for application to the grid in a manner such that the high voltage output is also inherently current limited. Accordingly, the need for high voltage current limiting by means of flux leakage and the resultant complexities thereof or by means of complicated current limiting circuitry is eliminated.

In one embodiment, a transformer with current-limiting magnetic flux leakage between its primary and secondary windings is driven at its primary winding by an alternating voltage to produce at its secondary winding a current-limited voltage for application to a series connection of a fluorescent lamp and the primary winding of a high voltage, current transformer. The current-limited, electrocution voltage is provided by the secondary winding of the high voltage, current transformer. A capacitor which shunts the primary winding of the current transformer limits the maximum voltage that can be generated across the windings on the high voltage, current transformer.

In another embodiment, two separate transformers are employed for the lamp and the electrocution grid, but the primaries of the transformers are connected in parallel and driven by a single source of alternating voltage from an inverter. The current-limited output of one of the transformers is applied to the lamp, and the current-limited output of the other transformer is applied to the electrocution grid.

In yet another embodiment, a three-legged transformer core having a single primary winding driven by an inverter source of the alternating voltage and two secondary windings respectively coupled to the lamp and the electrocution grid are used in lieu of two separate transformers.

Another object of my invention is the provision of an electric insect trap power supply in which one or more DC to AC inverters are employed to generate the lamp current and a high frequency, current-limited, alternating voltage which is applied to the primary winding of a high voltage transformer to produce the current-limited electrocution voltage. Using inverters operating at high frequency enables my electric insect trap power supply to be constructed of lighter weight, smaller, less expensive, and more efficient transformer components.

Several embodiments are shown. In five of my embodiments, a single inverter is employed to generate both the lamp current and the high electrocution voltage. In a sixth embodiment, two inverters powered by a common supply are used to provide the lamp current and the high electrocution voltage, respectively.

A further objective is to provide an electric insect trap power supply in which a high frequency voltage from a high voltage transformer is rectified before application to the electrocution grids so that the capacitance of the electrocution grids does not load down the high voltage transformer. In a preferred form, the voltage is rectified.

Still another objective is to provide an electric insect trap power supply in which a capacitor is employed to filter out harmonics of the inverter frequency to minimize spurious resonances in the high voltage transformer due to distributive capacitance in its secondary windings.

Yet another object of my invention is to provide an electric insect trap power supply in which a high voltage transformer is operated in a ferro-resonant mode or a pseudo-ferro-resonant mode. More particularly, it is an objective to provide an electric insect trap power supply having a high voltage transformer operated in a pseudo-ferro-resonant mode and in which thermally responsive means associated with lamp current producing means is provided to offset magnitude changes in the high voltage output due to changes in temperature of the high voltage transformer core. The thermally responsive means is thermally linked to the high voltage transformer core and causes the frequency of the input voltage to the high voltage transformer to change with changes of temperature to achieve the desired regulation.

Yet a further objective is to provide an electric insect trap power supply in which an alternating voltage field is established between the electrocution grid and the lamp to assist in starting the lamp and thus reduce the minimum starting voltage level required. In a preferred embodiment, capacitors are used to AC couple a high frequency, alternating voltage developed from the high voltage transformer between one of the lamp cathodes and the grid.

BRIEF DESCRIPTION OF THE DRAWINGS

The foregoing objects, features and advantages will be described in greater detail, and further objects, features and advantages will be made apparent in the following detailed description of the preferred embodiments which is given with reference to the several figures of the drawings, in which.

DETAILED DESCRIPTION

Figure 1:
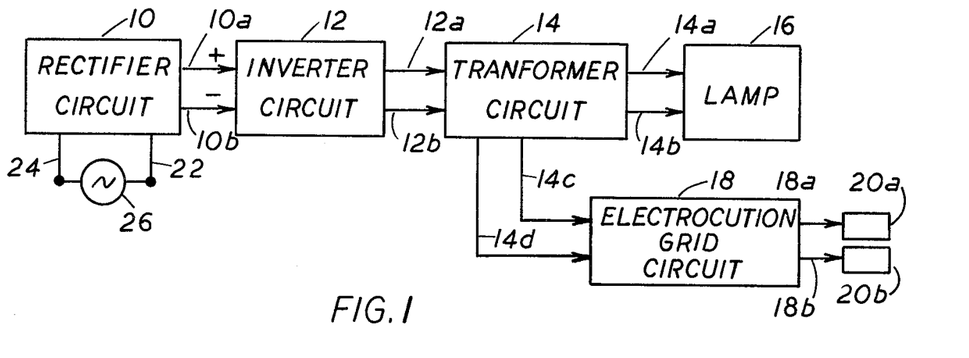
FIG. 1 is a block diagram of my electric insect trap power supply.

Referring now to the drawings, particularly FIG. 1, my electric insect trap power supply is seen to include a rectifier circuit 10, an inverter circuit 12, a transformer circuit 14, and an electrocution grid circuit 18, combined with a fluorescent lamp 16 and a pair of electrocution grid electrodes 20a and 20b to form an operable electric insect trap. The rectifier circuit 10 is connectable through a pair of leads 22 and 24 to a source of Ac voltage 26, such as the standard 60 Hz., 120 volt AC current provided by electric power utilities.

The electrocution grid electrodes 20a and 20b may be in the form of any number of well-known configurations, such as those shown in the aforementioned prior art patents which may be referred to for the details thereof. Preferably, the electrodes 20a and 20b are in the form of a pair of concentric, cylindrical grids surrounding and centrally aligned along the elongate center axis of the lamp. The grid electrodes are separated from one another by a selected air gap. When the high electrocution voltage is applied across the grid electrodes, electrostatic arcing therebetween will normally not occur except when an insect or the like is spaced therebetween. Each grid electrode has a plurality of openings to allow light to pass therethrough to attract the insects and to enable the insects to enter into the air gap. When the body of an insect shortens the air gap between the two electrodes 20a and 20b an electric arc strikes through the air and through the insect to kill it.

The electrocution grid circuit 18 produces the high electrocution voltage across a pair of outputs 18a and 18b respectively connected to grid electrodes 20a and 20b. The electrocution grid voltage is on the order of 1000 to 7000 volts, but the greater the air gap between electrodes 20a and 20b, the greater the high voltage produced across output 18a and 18b must be in order to achieve the desired electrocution results.

Still referring to FIG. 1, the rectifier circuit 10 produces a DC voltage across a pair of outputs 10a and 10b for powering inverter circuit 12. This DC voltage corresponds to the peak voltage of the AC source 26 and has a magnitude on the order of 160 volts with a polarity as indicated. If a DC voltage is available directly from a DC voltage supply, such as a battery, the rectifier circuit 10 may be eliminated entirely.

The inverter circuit 12 is a self-oscillating circuit which generates an alternating voltage across a pair of outputs 12a and 12b. This alternating voltage, in turn, is applied to the transformer circuit 14. In keeping with one aspect of my invention, to increase efficiency and to reduce the required size, cost and weight of the transformers, particularly the high voltage transformer, the frequency of the alternating voltage is selected to be substantially greater than the 60 Hz frequency of a standard AC power line. Preferably the frequency is on the order of 30 kHz, and may be as high as 100 kHz or higher.

The transformer circuit 14 performs two functions. In response to the alternating voltage provided at its input, the transformer circuit 14 provides an alternating, current-limited voltage at outputs 14a and 14b which is applied to operate, or light, the fluorescent lamp 16. Also in response to the input alternating voltage, the transformer circuit 14 produces an alternating high voltage at its outputs 14c and 14d which is applied to the input of electrocution grid circuit 18. Thus, the necessary electrical power for both the lamp and the electrocution grid are developed from the single inverter circuit 12.

The electrocution grid circuit 18 rectifies and, preferably, doubles the magnitude of this alternating high voltage to produce a corresponding high DC voltage across its output 18a and 18b and the grid electrodes 20a and 20b connected thereto.

As will be explained, the high voltage produced at 14c and 14d and across outputs 18a and 18b is inherently current limited to minimize the electrocution threat to persons using the trap. Preferably, the maximum current producible at the output of the electrocution grid circuit 18 is 10 milliamps.

Figure 2:
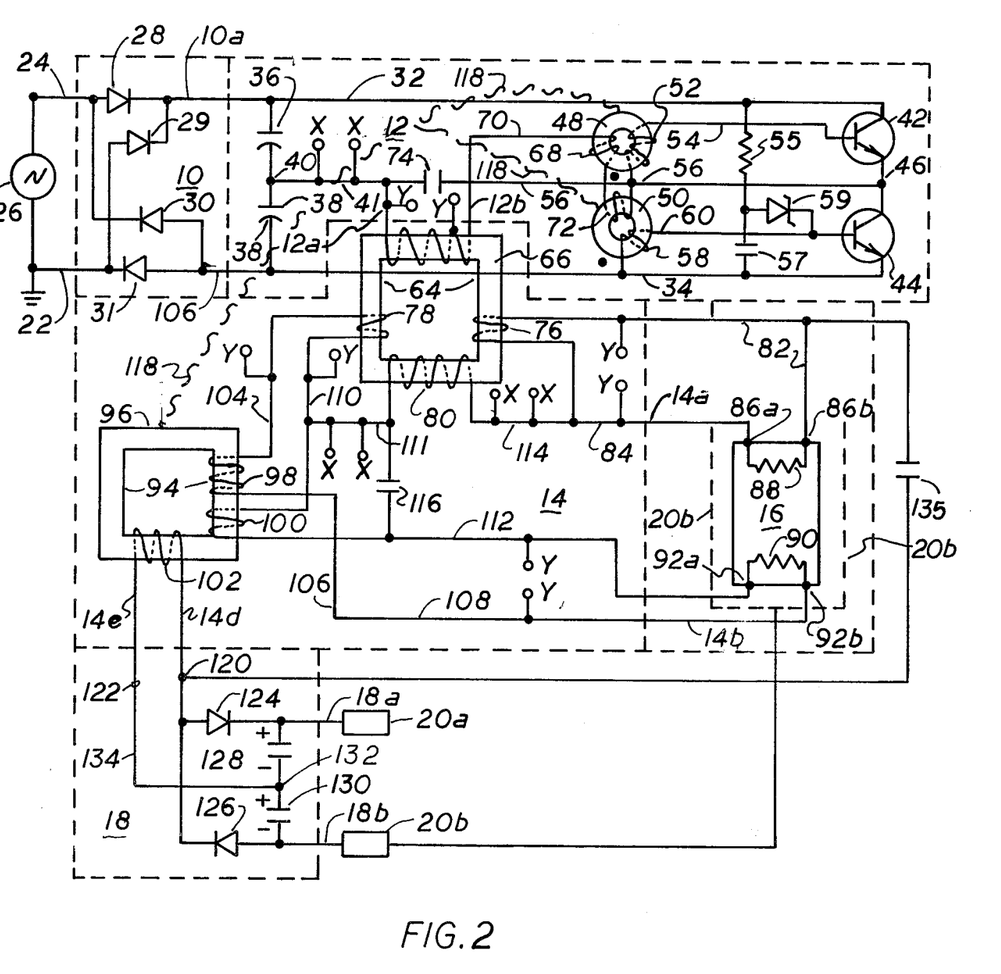
FIG. 2 is a schematic diagram of one embodiment of my electric insect trap power supply showing the various circuits in schematic form corresponding to the blocks of FIG. 1.

Referring now to FIG. 2, the various circuits shown in block form in FIG. 1 are illustrated in circuit schematic form for a preferred embodiment of my invention. As seen, the rectifier circuit 10 comprises four diodes 28, 29, 30, and 31 interconnected in a bridge circuit to produce a fullwave rectified voltage across outputs 10a and 10b with the positive voltage being produced on output 10a relative to output 10b.

Output 10a is connected to a positive voltage bus 32 of inverter circuit 12 and output 10b is connected to a negative voltage bus 34. A pair of electrolytic capacitors 36 and 38 are interconnected at a junction 40 and connected in series across voltage buses 32 and 34 for filtering of the rectified voltage. Inverter switching is achieved by a pair of NPN switching transistors 42 and 44, such as commercially available types MJE 13002 from Motorola. Transistors 42 and 44 are interconnected in series and function in push-pull fashion. The collector of transistor 42 is coupled to positive voltage bus 32 and the emitter of transistor 44 is connected to negitive voltage bus 34. The emitter of transistor 42 is connected to the collector of transistor 44 at a junction 46. Thus, the two transistors 42 and 44 are connected in series to reduce the voltage stresses, etc. applied to either one of them relative to that resulting in the more conventional parallel, push-pull configuration.

A pair of saturable, toroidal core transformers 48 and 50, such as commercially available type W 40603-TC from Magnetics, provide the necessary feedback and drive signals to alternately turn transistors 42 and 44 on and off in push-pull fashion. A winding 52 on saturable, toroidal transformer core 48 is connected between the base and emitter of switching transistor 42 through leads 54 and 56, and a similar winding 58 on core 50 is connected between the base and emitter of switching transistors 44 through leads 60 and negative voltage bus 34. The junction 40 between capacitors 36 and 38 is connected through primary winding 62 of an output transformer 64 to one side of another winding 68 wound around core 48 through a lead 70. The other side of winding 68 is connected through another winding 72 wound around core 50 and through lead 56 to the junction 46 between the serially connected, switching transistors 42 and 44. A capacitor 74 is connected in parallel with the series connection of primary winding 62, winding 68, and winding 72.

Initiation of alternative conduction is achieved by means of an RC circuit comprised of resistor 55 and capacitor 57 connected between the positive and negative voltage supply buses 32 and 34, and a Daic 59 connected from the junction therebetween and the base of transistor 44.

While it is significant that an efficient push-pull inverter be used, my electric insect trap power supply will function well with inverter circuits other than that shown in FIG. 2, and my invention is not limited to the circuit details of the inverter shown. Specifically, examples of suitable inverter circuits similar in operation to that shown in FIG. 2 are described in detail in my U.S. Pat. No. 4,184,128, now in reissue application, to which reference may be made for the details of operation. Briefly, transistors 42 and 44 of inverter circuit 12 alternately conduct to drive current through primary winding 62 alternating in opposite directions.

When power is first applied, capacitor 57 is charged through resistor 55 until Diac 59 breaks down and discharges capacitor 57 into the base of transistor 44 to turn it on.

When transistor 44 turns on, current is conducted therethrough and through primary winding 62 by way of capacitor 38, primary winding 62, line 70, winding 68, winding 72, line 56, junction 46, the collector and emitter of transistor 44 negative DC voltage bus 34. This current induces a positive feedback signal in winding 58 which is applied to the base of the transistor 44 through lead 60 to maintain transistor 44 conductive until saturation of core 50. Likewise, a negative feedback signal is induced in winding 52 by the current through winding 68 and applied to the base of transistor 42 through lead 54 to maintain transistor 42 off. After a period of time, cores 48 and 50 saturate which causes transistor 44 to turn off and, subsequently, transistor 42 to turn on.

When transistor 42 is on, current is conducted from the positive side of capacitor 36, through transistor 42, junction 46, line 56, winding 72, winding 68, line 70, primary winding 62, junction 40, and to the negative side of capacitor 36. The current through winding 68 induces a positive feedback signal in winding 52 which is applied to the base of transistor 42. Likewise, the current through winding 72 induces a negative feedback signal in winding 58 which is applied to the base of transistor 44. After a period, the transformer cores 48 and 50 again saturate which causes transistor 42 to turn off and, subsequently, transistor 44 to again turn on. Thus, each time saturation occurs, the two switching transistors 42 and 44 reverse their conductive state, and in this way the inverter generates a high frequency alternating voltage across junctions 46 and 40.

In keeping with one aspect of the invention, the capacitor 74 functions to filter out a substantial portion of the harmonics of the inverter frequency which would otherwise appear across the primary winding 62. Eliminating these harmonics advantageously minimizes the occurrences of spurious resonances in the secondary windings of high voltage transformer 94 and other circuitry of the transformer circuit 14 which typically result from the distributive capacitance invariably present in high voltage transformer windings. While the value of capacitor 74 of course will be different for different frequencies and power levels, for a frequency of 30 kHz and power of about 30 watt, a capacitance value of 0.022 microfarad for capacitor 74 would be suitable and results in a trapezoidally shaped waveform being produced across primary winding 62.

In keeping with another object of the invention, transformer 64 has a selected amount of magnetic flux leakage between the primary and secondary windings. Accordingly, the secondary winding current for driving lamp 16 is limited. More importantly, the secondary winding current is used to drive a high voltage transformer which, as a result, produces a current limited high voltage. This minimizes or eliminates the need to achieve current limiting in the high voltage transformer by means of flux leakage and resultant increases in size and cost. For safety reasons, the maximum short circuit current allowed for the electrocution grid is 10 ma.

The flux leakage and current limiting is achieved by physically separating the primary and secondary windings on core 66 while utilizing a ferrite material for core 66 having a relatively low permeability. Alternately, if a high permeability material such as steel is utilized, then current limiting may be achieved by introducing a selected amount of flux leakage between the primary and secondary windings by providing a magnetic shunting leg between the primary and secondary legs of the core with an air gap therein.

Referring now to the transformer circuit 14 of FIG. 2, it is seen that transformer 64 has three secondary windings 76, 78 and 80, which respond to the alternating voltage across primary winding 62. Secondary windings 76 and 78 function to generate cathode heating voltages and secondary winding 80 provides drive current to operate lamp 16. Secondary winding 76 is connected through leads 82 and 84 across a pair of inputs 86a and 86b of lamp 16. Inputs 86a and 86b, in turn, are connected to opposite sides of lamp cathode 88, and the voltage thereacross develops a current through cathode 88 to heat the cathode.

The second cathode 90 at the opposite end of lamp 16 is connected between a pair of inputs 92a and 92b and received a cathode heating current from the output of secondary winding 78. Typically, a voltage on the order of 3.6 volts is provided across each of inputs 86a and 86b, and 92a and 92b to heat the cathodes.

The voltage produced across secondary winding 80 in response to the alternating voltage applied across primary winding 62 is applied across lamp 16 and inputs 86a and 92a to provide a voltage thereacross on the order of 70 volts for driving current through lamp 16. One side of secondary winding 80 is connected through a lead 114 and lead 84 to lamp input 86a. The other side of secondary winding 80 is coupled through a lead 111, primary winding 100 and lead 112 to lamp input 92a. Because of leakage inductance in transformer 64, secondary winding 80 appears as a substantially constant current source to lamp 16. This advantageously enables use of fluorescent lamps with different voltage ratings for lamp 16.

The connection of cathode 90 to secondary winding 78 involves transformer circuit 14. Transformer circuit 14 includes a current transformer 94 having a core 96 about which are wound two primary windings 98 and 100 and a secondary winding 102. One side of secondary winding 78 of transformer 64 is connected to lamp input 92b through a lead 104, primary winding 98 of transformer 94, a lead 106 and a lead 108. The other side of secondary winding 78 is connected to lamp input 92a through a lead 110, primary winding 100 of transformer 94, and a lead 112.

The limited lamp current from secondary winding 80 and which passes through primary winding 100, induces a current-limited, high voltage signal across secondary winding 102 which is coupled to electrocution grid circuit 18. As previously noted, since the primary winding current is limited, the current output available from winding 102 is limited, and the need for introducing current limiting flux leakage in the inductive coupling path between the primary and secondary windings of high voltage transformer 94 is minimized or eliminated.

The voltage developed across secondary winding 102 is determined in principal part by the lamp drive, or arc, current, and the capacitance of a capacitor 116 connected in shunt across primary winding 100.

By selecting different capacitance values for capacitor 116, transformer 94 will operate in two different modes for a given frequency. If capacitor 116 is a relatively large capacitor, the voltage developed across it and therefore across primary winding 100 will be relatively small in magnitude to cause the transformer 94 to operate in a linear mode without ever reaching the saturation levels of core 96. With a smaller value for capacitor 116, transformer 94 will operate in a ferro-resonant mode in which the transformer core 96 reaches saturation during each half-cycle. In that mode, capacitor 116 is first charged with one polarity and then discharges through the primary winding 100 in one direction upon saturation of core 96 and is recharged to an opposite polarity after nearly a half-cycle. It is then again discharged through the primary winding 100 in the opposite direction when core 96 saturates in the opposite sense. In that event, the voltage developed across the primary winding 100 will appear as a sinusoidal waveform with flatened peaks and the harmonics of the inverter frequency substantially attenuated.

The greater voltage across primary winding 100 permitted when operating transformer 94 in the ferro-resonant mode enables the use of substantially fewer turns on the secondary winding 102 to achieve a given output voltage than would be required when operating it in the linear mode. When operated in ferro-resonant mode, a secondary winding to primary winding turns the ratio on the order of 100 to 1 is typically adequate. Reducing the number of turns is advantageous since it reduces the amount of distributed capacitance as well as the inductance of the secondary winding 102 and thereby reduces spurious resonances. Fewer turns also reduces the cost of the transformer.

Pseudo-ferro-resonant mode operation may also be obtained without capacitor 116 by selecting a ferrite material for core 96 which has a relatively large cooercive force characteristic on the order of 0.25 oersted to limit the voltage across primary winding 100.

Because the core 96 is driven to saturation in the ferro-resonant and pseudo-ferro-resonant modes of operation, high magnetic loss relative to operation in a linear mode becomes more significant. Accordingly, this mode is preferred when the power being handled is relatively low, such as 10 watts or less.

When operating transformer 94 in the ferro-resonant or pseudo-ferro-resonant mode, the saturation limits of core 96 may decrease enough with increases in the core temperature to cause the voltage across secondary winding 102 to significantly decrease. In keeping with one aspect of the invention, variations of the secondary winding voltage 102 due to temperature sensitivity of the magnetic core 96 are minimized or cancelled when operating in the pseudo-ferro-resonant mode by utilizing a second temperature responsive means in the inverter circuit 12 to offset such changes. Specifically, as indicated by thermal coupling lines 118, saturable, toroidal cores 48 and 50 are thermally coupled with the temperature responsive core 96, so that the saturable, toroidal cores 48 and 50 will increase in temperature with increases in temperature of the transformer core 96. Such thermal coupling may comprise a metal coupling member or may simply comprise selective packaging of the cores 48 and 50 together with high voltage transformer 96, so that their temperatures vary proportionately with one another.

Increasing the temperature of saturable, torodial cores 48 and 50 causes their saturation limits to decrease and thus the frequency of operation of inverter 12 to increase. As a result, the frequency of the alternating current applied to primary winding 100 increases. This increase in frequency causes an increase in the output voltage of transformer 94 to offset the temperature responsive decreases. Conversely, when the temperature decreases, the inverter frequency decreases to offset temperature responsive increases in the high voltage produced by secondary winding 102. Accordingly, the high voltage is regulated over a wide range of temperature.

The connection of the opposite sides of cathode heating secondary winding 87 in series with the two primary windings 98 and 100, respectively, is done, so that a high voltage corresponding to the cathode heating voltage is not induced in the high voltage secondary winding 102. The cathode heating current through primary winding 98 cancels the effect of the cathode heating current through winding 100. This coupling arrangement contemplates that inverter circuit 12 and transformer 64 are in a self-contained ballast unit in which only pairs of output leads, such as leads 104 and 110 of winding 78 and leads 82 and 84 of winding 76, for lamp 16 are available for connection to the high voltage transformer primary.

Figure 4:
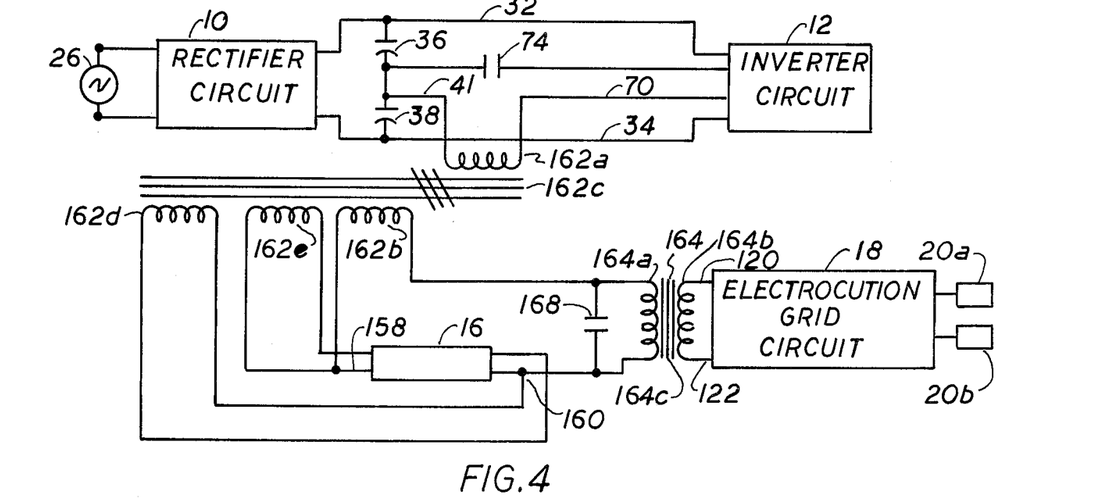
FIG. 4 is another embodiment of my electric insect trap power supply similar to that of FIG. 2 but in which coupling of the lamp cathode heating coils with the high voltage transformer is not required.

If, on the other hand, access may be gained to the inverter circuit 12 and transformer 64, then the current for the high voltage transformer may be taken by tapping into and placing a single high voltage transformer primary in series with any one of several leads which carry limited currents, and two primary windings for the high voltage transformer would not be required. An embodiment of such a circuit is shown in FIG. 4 and discussed below. Some of the points in the circuit of FIG. 2 where this may be accomplished are indicated by pairs of "X"'s at leads 56, 114 and 111. The connection would be made by opening the lead connection between the pairs "X"'s and coupling the pair of points marked by the "X"'s to the opposite sides of a primary winding of high voltage transformer 94.

Alternatively, if the high voltage transformer is provided with its own current limiting means, such as a core configuration which provides the needed amount of flux leakage between the primary and secondary windings, then the pick-off from the ballast portion of the circuit can be achieved by connecting the high voltage transformer primary across various points at which a voltage is developed. Some of these points are indicated on the schematic of FIG. 2 by pairs of "Y"'s. These voltage points include connections across the cathode heating voltage leads 82 and 84, and 104 and 110. Another pair of points include an intermediate tap and one side of primary winding 62.

A significant amount of capacitance is associated with electrocution grid electrodes 20a and 20b. This grid capacitance would substantially load down the high voltage transformer if the high alternating voltage from the high voltage transformer secondary winding was directly coupled across the electrodes 20a and 20b.

In accordance with my invention, this difficulty is overcome by rectifying the alternating high voltage before it is applied to the electrocution grid electrodes 20a and 20b. Specifically, the current-limited high voltage developed across secondary winding 102 of high voltage transformer 94 is applied to a pair of inputs 120 and 122 of electrocution grid circuit 18. Electrocution grid circuit 18 functions to produce a high unidirectional voltage across its outputs 18a and 18b which is approximately double the peak magnitude of the high voltage applied to its inputs 120 and 122.

Doubling the voltage advantageously reduces the number of secondary winding turns required for high voltage transformer 94. The electrocution grid circuit 18 includes a pair of diodes 124 and 126 and a pair of serially connected capacitors 128 and 130. A junction 132 between capacitors 128 and 130 is connected to input 122 and to one side of secondary winding 102 through a lead 134. Diode 124 has it cathode connected to the other side of capacitor 128 and its anode connected to input 120 and the other side of secondary winding 102. Diode 126 has its anode connected to the other side of capacitor 130 and its cathode connected to the mode of diode 124 and input 12. During halfwaves when the voltage at input 122 is positive relative to that an input 120, current through diode 126 charges capacitor 130 to the peak voltage with the polarity indicated. As a result, the voltage across the series connection of capacitors 128 and 130 is equal to the sum of the voltage across each of the capacitors individually. This high, doubled voltage is applied to electrocution grid electrodes 20a and 20b through output leads 18a and 18b.

In keeping with one of the objectives of my invention, the grid of electrocution electrode 20b is utilized as a starting aid for lamp 16 in those embodiments of my invention in which the primary winding of high voltage transformer receives power independently of the lamp current. Such embodiments are described above in reference to FIG. 2 in which the primary winding of the high voltage transformer 100 is coupled across the indicated pairs of "Y"'s or in series between the one pair "X"'s located at lead 41 in the inverter circuit 12, rather than, being coupled in series with the lamp 16. This is achieved by providing a capacitor 135 for AC coupling the high alternating voltage from the high voltage transformer winding 102 at input 120 of electrocution grid circuit 18 to lamp input 86b and thus cathode 88. Inner electrocution grid electrode 20b is also AC coupled to the outer side of high voltage transformer through capacitor 130. Consequently, a very low current, high alternating voltage field is developed between inner electrocution grid electrode 20b and lamp cathode 88 to assist in starting lamp 16. Accordingly, the requisite starting voltage required to be developed across secondary winding 80 for starting lamp 16 is reduced which yields a reduced cost and greater efficiency for transformer 64 and inverter circuit 12.

Figure 3:
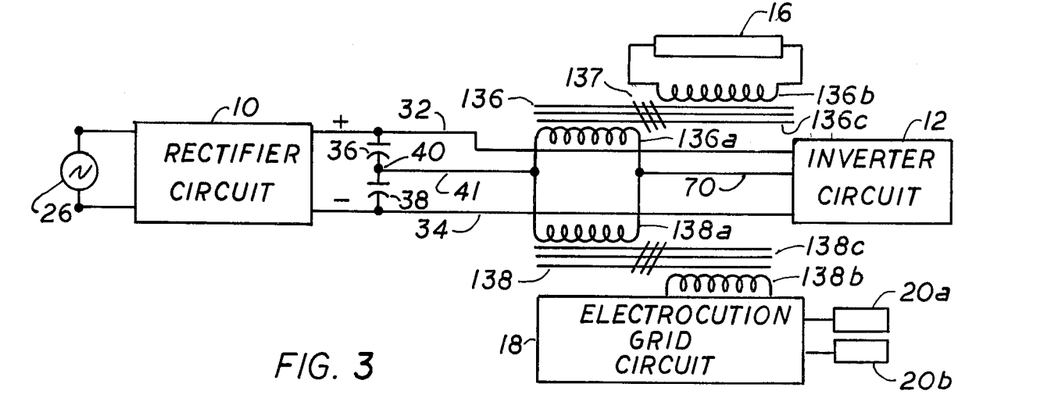
FIG. 3 is another embodiment shown partially in block form and partially in schematic form in which separate transformers are employed for the lamp and the electrocution grid to minimize interaction between those circuits.

Turning now to FIG. 3, another embodiment of my electric insect trap power supply is shown in which one current-limiting transformer 136 is employed to drive fluorescent lamp 16 and a separate current-limiting transformer 138 is provided for producing the high voltage. Advantageously, this arrangement minimizes flickering of lamp 16 resulting from sparking in the electrocution grid circuit 18 to a greater extent than the circuit in FIG. 1.

Current-limiting transformer 136 has a primary winding 136a and a secondary winding 136b wound about a transformer core 136c. Core 136c has a selected amount of flux leakage as indicated by triple diagonal lines 137 to provide the requisite current limiting. High voltage transformer 138 also has the necessary flux leakage characteristics to achieve current limiting. The primary windings 136a and 138a are connected in parallel between lead 70 of inverter circuit 12 and junction 40 between capacitors 36 and 38. Accordingly, an alternating voltage signal is generated across both primary windings 136a and 138a.

Lamp 16 is shown with only a single pair of inputs to illustrate an instant-start type fluorescent lamp in which a very high starting voltage is first applied to start the lamp with cathode heating being achieved by the current going through the lamp. The high voltage starting signal is damaging to the cathodes, and consequently, such instant-start lamps generally have a shorter useful life expectancy than conventional or rapid-start fluorescent lamps. Since a larger starting voltage is required, the use of the electrocution grid as a starting aid is particularly advantageous. If lamp 16, on the other hand, is not such an instant-start type fluorescent lamp, but is rather a rapid-start or conventional type fluorescent lamp having two pairs of inputs for cathode heating, then two additional cathode heating secondary windings are provided on transformer 136 and connected across these pairs of cathode inputs, respectively.

For purposes of simplicity, the remaining embodiments of my insect trap, except that of FIG. 4, illustrate lamp 16 with only a single pair of terminals. However, it should be understood that lamp 16 can be either an instant-start, a rapid-start or a conventional type lamp. In the event of rapid-start lamp operation, a source of cathode heating voltage is provided in the manner described above with reference to FIG. 2.

Figure 3A:
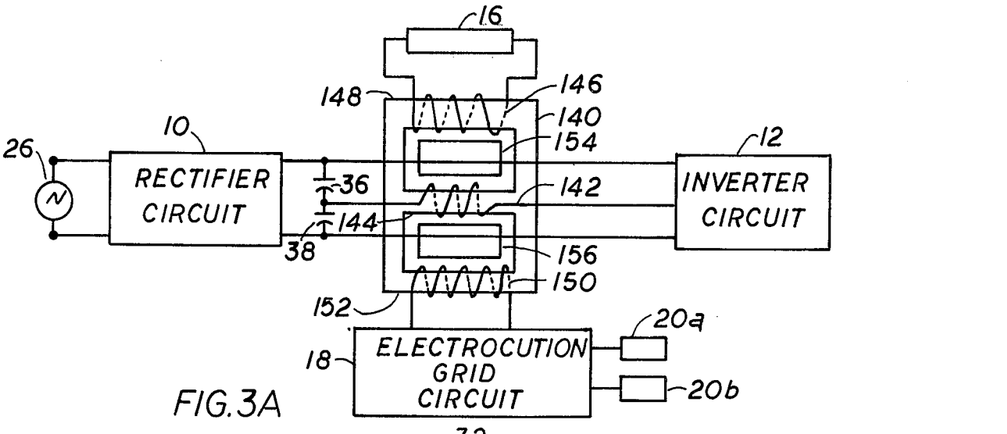
FIG. 3a is another embodiment similar to that of FIG. 3 but in which a single three-legged transformer core with separate secondary windings for the lamp and the electrocution grid is employed in lieu of the two transformers of FIG. 3.

Referring now to FIG. 3a another embodiment of my electric insect trap power supply is shown. This embodiment is similar to that of FIG. 2 and operates in substantially the same fashion. However, a single three-legged magnetic core with a primary winding 142 wound around the central leg 144 is employed in lieu of the two primary windings 136a and 138a of the two transformers 136 and 138. Likewise, secondary winding 136b is replaced by a secondary winding 146 wound around a second transformer core leg 148. Also, high voltage transformer secondary winding 138b of FIG. 3 is replaced by a high voltage secondary winding 150 wound around a third transformer core leg 152.

Controlled leakage is achieved by means of magnetic shunts. A magnetic shunt 154 inserted between the transformer core legs 144 and 148 provides a selected amount of flux leakage between primary winding 142 and secondary winding 146 to achieve the desired degree of current limiting of the generated alternating voltage applied across lamp 16. Likewise, a magnetic shunt 156 is inserted between transformer core legs 144 and 152 to provide the requisite flux leakage between primary winding 142 and secondary winding 150 for current limiting of the high voltage applied to electrocution grid circuit 18.

Referring to FIG. 4, another embodiment of my electric insect trap power supply is shown similar to that of FIG. 2 but in which access to the lamp ballast transformer 162 is available. Accordingly, the coupling of the pair of cathode heating secondary windings 162d and 162e of transformer 162 with a high voltage transformer 164 is eliminated. Inverter circuit 12 generates an alternating voltage across a primary winding 162a which is wound around a transformer core 162c of a current limiting transformer 162. As indicated, core 162c has a selected amount of flux leakage for purposes of current limiting. A lamp drive secondary winding 162b of current limiting transformer 162 is connected in series through lamp 16 with a primary winding 164a of a current transformer 164. Transformer 164 has a core 164c and a secondary 164b which is coupled to inputs 122 and 120 of electrocution grid 18. As with the other embodiments, a capacitor 168 is connected across the primary winding 164a to limit maximum voltage, to filter or to cause the transformer 168 to operate in a ferro-resonant mode.

A particularly advantageous safety feature of the embodiments of my electric insect trap power supply in which power for the high voltage is derived from the lamp current, such as shown in FIG. 4, is that if lamp 16 should be removed or burn out and create an open circuit, the high voltage transformer 164 is disabled from producing high voltage on its output. Accordingly, the risk of high voltage shock to users of the insect trap is only present when the lamp is lit and the operability of the insect trap is apparent.

Figure 5:
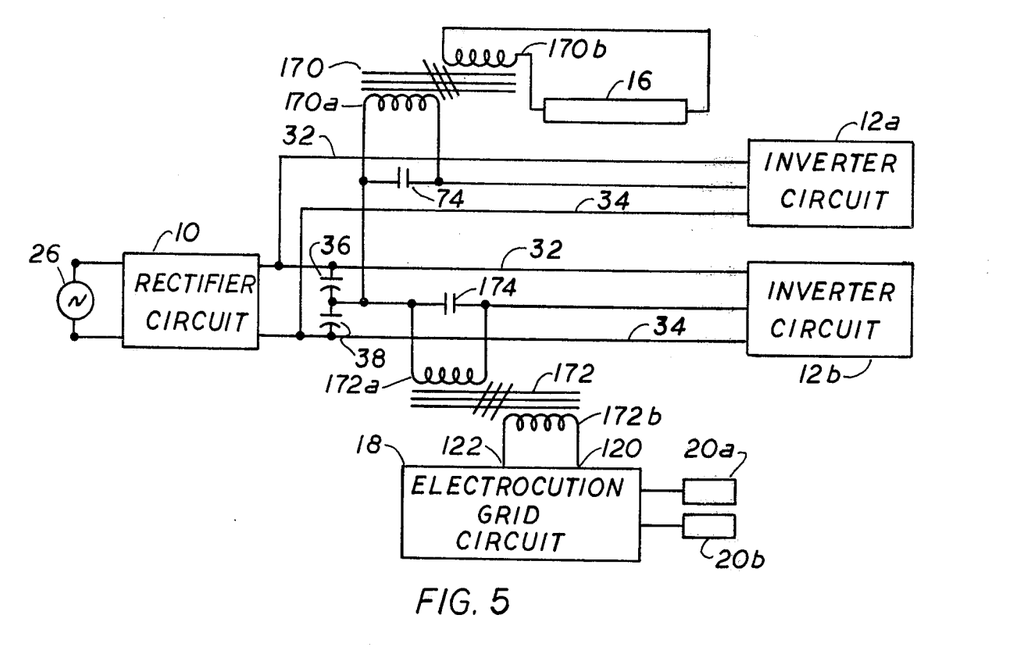
FIG. 5 is yet a further embodiment of my electric insect trap power supply in which a pair of inverters powered by a common power supply are employed to respectively generate the lamp current and high electrocution voltage.

Referring to FIG. 5, another embodiment is shown in which a pair of inverters 12a and 12b are employed to generate the lamp drive current and the high alternating voltage, respectively. As with the embodiment of FIG. 3, greater isolation between the lamp current and the high voltage circuitry is achieved than in the embodiment of FIG. 2. Further, if desired, the two inverters 12a and 12b are substantially the same in structure and operation. Also, both inverters are powered by a single source of DC power, rectifier circuit 10.

The inverter 12a develops an alternating voltage across a primary winding 170a of a transformer 170 which induces a limited current in a secondary winding 170b to operate lamp 16.

The inverter 12b on the other hand develops an alternating voltage across a primary winding 172a of transformer 172. This induces a high alternating electrocution voltage across a secondary winding 172b which is coupled to the inputs of electrocution grid circuit 18. A capacitor 174 connected in parallel with primary winding 172a functions to filter inverter frequency harmonics.

While several particular embodiments have been shown and described, it should be appreciated that many variations may be made without departing form my invention as claimed below. For instance, although the use of one of the electrocution grids as a lamp starting aid and regulation of the high voltage by thermally responsive means is not shown and described with respect to all embodiments, these features are, of course, suitable for use with the other embodiments, as indicated, and their presence in these other embodiments, although not shown, should be presumed.

I claim:

1. A power supply for an electric insect trap having an electrocution grid for killing insects and a fluorescent lamp for attracting insects to the grid, comprising:
    means including an inverter for generating an alternating voltage;
    means responsive to said alternating voltage for providing a limited current to operate the fluorescent lamp; and
    means responsive to said alternating voltage for producing a current-limited high voltage for application to the electrocution grid, said current-limited high voltage being supplied by way of a manifest current-limiting-means that is operative to limit the current supplied to the grid to a distinct pre-established maximum level.

2. The electric insect trap power supply of claim 1 in which said generating means includes a rectifier with an input connectable with a standard source of AC power and an output connected with the inverter for providing a DC voltage thereto.

3. The electric insect trap power supply of claim 1 in which said lamp current providing means includes a current-limiting transformer with a selected amount of flux leakage and having an output connected to said lamp; and
    said generating means includes means for applying said alternating voltage to a primary winding of said current-limiting transformer.

4. The electric insect trap power supply of claim 3 in which the output of said current-limiting transformer functions substantially as a constant current source of said lamp.

5. The electric insect trap power supply of claim 3 in which said high voltge producing means includes said current-limiting transformer and a current transformer coupled therewith.

6. The electric insect trap power supply of claim 5 in which said current transformer is connected in series with the constant current source output of the current-limiting transformer.

7. The electric insect trap power supply of claim 1 in which said high voltage providing means includes a current-limiting transformer for producing a current-limited output voltage and means responsive to said current-limited output voltage for producing said high voltage, and said alternating voltage generating means includes means for applying said alternating voltage to an input of said current-limiting transformer.

8. The electric insect trap power supply of claim 1 in which:

said alternating voltage generating means generates said alternating voltage across the primary winding of a transformer; and both said lamp voltage providing means and said high voltage producing means include said transformer.

9. The electric insect trap power supply of claim 8 in which said transformer is a current-limiting transformer.

10. The electric insect trap power supply of claim 8 in which said alternating voltage generating means includes a capacitor connected across the primary winding to filter out harmonics of the alternating voltage frequency.

11. The electric insect trap power supply of claim 1 in which said high voltage producing means includes a transformer with a primary winding coupled with said alternating voltage and a secondary winding for producing a corresponding voltage thereacross, and means for rectifying said corresponding voltage before it is applied to the grid.

12. The electric insect trap power supply of claim 11 in which said rectifying means includes a voltage doubler circuit connected with said secondary winding for producing a high voltage having a magnitude substantially twice that of the corresponding voltage for application to said electrocution grid.

13. The electric insect trap power supply of claim 1 in which said alternating voltage generating means includes means for minimizing the harmonics of the alternating voltage frequency and the resulting detrimental affects of spurious resonances produced thereby.

14. The electric insect trap power supply of claim 13 in which:

said alternating voltage is generated across the primary winding of a transformer; and said harmonics minimizing means comprises a capacitor connected in parallel with said primary winding.

15. The electric insect trap power supply of claim 1 in which said high voltage producing means includes:

a high voltage transformer with a ferro-magnetic core coupled with said alternating voltage generating means; and means for operating the transformer is a ferro-resonant mode.

16. The electric insect trap power supply of claim 1 in which said alternating voltage has a waveform which is substantially trapezoidal in shape.

17. The electric insect trap power supply of claim 1 including means coupled with the high voltage producing means and the lamp to assist in starting the fluorescent lamp.

18. The electric insect trap power supply of claim 1 in combination with a pair of electrocution grids coupled with said high voltage producing means and a fluorescent lamp coupled with said limited current providing means to form an operational electric insect trap.

19. The electric insect trap power supply of claim 1 including means coupled with the high voltage providing means for establishing an alternating voltage field between the grid and the lamp to assist in starting the lamp.

20. A power supply for an electric insect trap having an electrocution grid and a fluorescent lamp for attracting insects to the grid, said power supply being connectable with a source of AC power and comprising:

a ballast for the lamp, including an inverter operating at a frequency substantially greater than that of the source of AC power; and means including a high voltage transformer coupled with the inverter and driven at the inverter frequency to produce a high voltage for application to the grid, said means to produce said high voltage including manifest current-limiting means operative to limit the current supplied to the grid to a distinct pre-established maximum level.

21. The electric insect trap power supply of claim 20 in which said inverter frequency is at least ten times that of the source of AC power.

22. The electric insect trap power supply of claim 21 in which said inverter frequency is on the order of 30 kHz.

23. The electric insect trap power supply of claim 20 in which said high voltage producing means includes a rectifier to rectify the high voltage produced by the transformer before application to the grid.

24. The electric insect trap power supply of claim 20 including means for regulating the high voltage.

25. The electric insect trap power supply of claim 20 including means for filtering out harmonics of the inverter frequency.

26. The electric insect trap power supply of claim 20 in which said transformer is operated in a ferro-resonant mode.

27. A power supply for an electric insect trap having a pair of electrocution grids with grid capacitance therebetween and a fluorescent lamp for attracting insects to the grids, comprising:

means for generating a current-limited, alternating high voltage having a frequency which would cause the high voltage generating means to be substantially loaded down by said grid capacitance if applied directly to the grids; and means for rectifying the alternating high voltage to produce a high unidirectional electrocution voltage for application to the grids, said rectification preventing the grid capacitance from excessively loading down the current-limited alternating high voltage, said means for generating including manifest current-limiting means operative to limit the current supplied to the grids to a distinct pre-established maximum level.

28. The electric insect trap power supply of claim 27 in which said alternating high voltage generating means includes a DC and AC inverter.

29. The electric insect trap power supply of claim 27 in which said alternating high voltage has a frequency in the RF frequency spectrum.

30. The electric insect trap power supply of claim 27 in which said rectifying means comprises a fullwave rectifier.

31. The electric insect trap power supply of claim 27 in which said rectifying means includes a voltage doubling circuit for doubling the magnitude of the alternating high voltage before it is applied to the grids.

32. The electric insect trap power supply of claim 27 in combination with a pair of grids and a lamp form an operative insect trap.

* * * * *